(12) United States Patent
Lieng et al.

(10) Patent No.: US 11,787,994 B2
(45) Date of Patent: Oct. 17, 2023

(54) METHOD OF USING COMPOSITE DIVERSION PARTICLE AGGLOMERATIONS

(71) Applicant: CARBO CERAMICS INC., Houston, TX (US)

(72) Inventors: Thu Lieng, Richmond, TX (US); Todd Roper, Katy, TX (US); Olatunji Orekha, Houston, TX (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

(21) Appl. No.: 17/676,202

(22) Filed: Feb. 20, 2022

(65) Prior Publication Data

US 2022/0177768 A1 Jun. 9, 2022

Related U.S. Application Data

(62) Division of application No. 16/109,062, filed on Aug. 22, 2018, now abandoned.

(51) Int. Cl.
| | |
|---|---|
| *E21B 43/26* | (2006.01) |
| *C09K 8/516* | (2006.01) |
| *C09K 8/508* | (2006.01) |
| *C09K 8/504* | (2006.01) |
| *C09K 8/80* | (2006.01) |
| *C09K 8/88* | (2006.01) |

(Continued)

(52) U.S. Cl.
CPC ............ *C09K 8/516* (2013.01); *C09K 8/5045* (2013.01); *C09K 8/5083* (2013.01); *C09K 8/805* (2013.01); *C09K 8/845* (2013.01); *C09K 8/882* (2013.01); *C09K 8/92* (2013.01); *E21B 43/26* (2013.01); *E21B 43/267* (2013.01)

(58) Field of Classification Search
CPC .... C09K 8/516; C09K 8/5045; C09K 8/5083; C09K 8/845; C09K 8/882; C09K 8/92; E21B 43/26; E21B 43/267
See application file for complete search history.

(56) References Cited

U.S. PATENT DOCUMENTS

| | | |
|---|---|---|
| 3,784,585 A | 1/1974 | Schmitt et al. |
| 4,526,695 A | 7/1985 | Erbstoesser et al. |

(Continued)

*Primary Examiner* — Silvana C Runyan
(74) *Attorney, Agent, or Firm* — Patterson + Sheridan, LLP (57) ABSTRACT

The present disclosure relates to material for use in oil and gas well completion activities. More particularly, the present disclosure relates to diversion particles, along with methods for making and using the diversion particles. In an embodiment, a composite diversion material includes a non-degradable component comprising two or more non-degradable particulates, wherein the non-degradable particulates have a long term permeability at 7,500 psi of at least about 20 D. The composite diversion material includes a degradable component surrounding at least a portion of the non-degradable component. In another embodiment, a method of making a composite diversion material includes mixing non-degradable proppant particles with an aqueous solution containing a first degradable material to provide a mixture having a proppant concentration of at least about 20 volume percent. The method includes drying the mixture at a temperature of from about 25° C. to about 200° C. to provide the composite diversion material.

19 Claims, 4 Drawing Sheets

(51) Int. Cl.
*C09K 8/84* (2006.01)
*C09K 8/92* (2006.01)
*E21B 43/267* (2006.01)

(56) References Cited

U.S. PATENT DOCUMENTS

| | | | |
|---|---|---|---|
| 5,323,307 A | 6/1994 | Wolf et al. | |
| 5,955,144 A | 9/1999 | Sinclair et al. | |
| 6,279,656 B1 | 8/2001 | Sinclair et al. | |
| 6,323,307 B1 | 11/2001 | Bigg et al. | |
| 6,330,916 B1 | 12/2001 | Rickards et al. | |
| 6,776,235 B1 | 8/2004 | England | |
| 9,135,475 B2 | 9/2015 | Lecerf et al. | |
| 9,919,966 B2 | 3/2018 | Gupta | |
| 9,920,607 B2 | 3/2018 | Brannon et al. | |
| 9,920,610 B2 | 3/2018 | Nelson et al. | |
| 9,938,811 B2 | 4/2018 | Bestaoui-Spurr et al. | |
| 10,012,064 B2 | 7/2018 | Mendell | |
| 10,041,327 B2 | 8/2018 | Nelson et al. | |
| 10,087,722 B2 | 10/2018 | Lecerf et al. | |
| 10,221,649 B2 | 3/2019 | Shahri et al. | |
| 10,253,598 B2 | 4/2019 | Crews et al. | |
| 10,344,204 B2 | 7/2019 | Mendell et al. | |
| 10,385,257 B2 | 8/2019 | Mendell et al. | |
| 10,385,258 B2 | 8/2019 | Mendell et al. | |
| 10,597,982 B2 | 3/2020 | Shahri et al. | |
| 10,696,893 B2 | 6/2020 | Okamoto et al. | |
| 10,914,139 B2 | 2/2021 | Shahri et al. | |
| 10,990,717 B2 | 4/2021 | Gupta et al. | |
| 2004/0014607 A1 | 1/2004 | Sinclair et al. | |
| 2005/0126780 A1 | 6/2005 | Todd et al. | |
| 2006/0175059 A1 | 8/2006 | Sinclair et al. | |
| 2009/0277630 A1* | 11/2009 | McDaniel | G01V 3/30 166/250.1 |
| 2010/0126717 A1* | 5/2010 | Kuchuk | E21B 49/008 166/250.03 |
| 2011/0240293 A1 | 10/2011 | Lesko et al. | |
| 2012/0227967 A1 | 9/2012 | Shaikh et al. | |
| 2013/0025860 A1 | 1/2013 | Robb et al. | |
| 2013/0292109 A1* | 11/2013 | Smith, Jr. | E21B 43/267 166/250.1 |
| 2016/0024909 A1* | 1/2016 | Han | E21B 47/11 166/250.1 |
| 2016/0075941 A1* | 3/2016 | Duenckel | E21B 43/088 507/202 |
| 2016/0168452 A1 | 6/2016 | Cannan et al. | |
| 2016/0215205 A1 | 7/2016 | Nguyen et al. | |
| 2017/0166798 A1 | 6/2017 | Okamoto et al. | |
| 2017/0210976 A1 | 7/2017 | Okamoto et al. | |
| 2018/0196898 A1 | 7/2018 | Gupta et al. | |
| 2018/0306013 A1 | 10/2018 | Karale et al. | |
| 2019/0145225 A1 | 5/2019 | Zhang et al. | |

* cited by examiner

METHOD OF USING COMPOSITE DIVERSION PARTICLE AGGLOMERATIONS

CROSS-REFERENCE TO RELATED APPLICATIONS

This patent application is a divisional application claiming priority to U.S. patent application Ser. No. 16/109,062, filed Aug. 22, 2018, which has published as U.S. Patent Pub. No. U.S. 2020/0063015 A1 and which is incorporated herein by reference in its entirety.

TECHNICAL FIELD

The present disclosure relates to material for use in oil and gas well completion activities. More particularly, the present disclosure relates to diversion particles, along with methods for making and using the diversion particles.

BACKGROUND

Diversion materials are used to assist hydraulic fracturing operations. The function of the diversion materials can be as a blocking agent that stops or reduces fluid flow through casing perforations and/or their adjacent fractures so that fluid pressure in a hydraulic fracturing operation can be focused on less permeable regions of the subterranean formation. The diversion materials are adapted to dissolve or degrade over time so that the once blocked fractures and/or perforations can produce after a period of time, when completion of the hydraulic fracturing operations has ceased, for example. Existing diversion materials, such as ball sealers, contain polylactic acid, which can be slow to dissolve or degrade and, in some cases involving low temperature wells, must be flowed back out of a well. And oftentimes, the placement of diversion materials displaces proppant from the fractures in the near well-bore region at or near the perforations so that when the diversion materials are removed, the near well-bore region can be left devoid of suitable amounts of proppant, resulting in undesirable fracture closure.

What is needed, therefore, is a diversion material that can dissolve or degrade quickly while maintaining sufficient proppant concentrations in the near well-bore region.

BRIEF SUMMARY

In an embodiment, a composite diversion material includes a non-degradable component comprising two or more non-degradable particulates, wherein the non-degradable particulates have a long term permeability at 7,500 psi of at least about 20 D. The composite diversion material includes a degradable component surrounding at least a portion of the non-degradable component.

In another embodiment, a method of making a composite diversion material includes mixing non-degradable proppant particles with an aqueous solution containing a first degradable material to provide a mixture having a proppant concentration of at least about 20 volume percent. The method includes drying the mixture at a temperature of from about 25° C. to about 200° C. to provide the composite diversion material.

In another embodiment, a method of placing a diverter material in a subterranean formation includes injecting a hydraulic fluid comprising a composite diversion material into a wellbore and an adjacent subterranean formation at a rate and pressure sufficient to place the composite diversion material into a portion of a fracture in the subterranean formation. The method includes removing the degradable component from the composite diversion material by contact with a fluid after a period of time from placement in the fracture. The fracture experiences a reduction in width of less than 5% when the degradable component is completely removed from the composite diversion material from when the composite diversion material was initially placed into the fracture.

BRIEF DESCRIPTION OF THE DRAWINGS

Some embodiments of the present disclosure may be understood by referring to the following description and accompanying drawings that are used to illustrate embodiments. In the drawings.

DETAILED DESCRIPTION

In the following description, numerous specific details are set forth. However, it is understood that embodiments of the present disclosure may be practiced without these specific details. In other instances, well-known structures and techniques have not been shown or described in detail in order not to obscure the understanding of this description.

The term "agglomeration," as used herein, is defined as a plurality of particles that are adhered to or otherwise attached to one another to form a larger particle.

The term "apparent specific gravity," as used herein, is the weight per unit volume (grams per cubic centimeter) of the particles, including the internal porosity. The apparent specific gravity values given herein were determined by the Archimedes method of liquid (water) displacement according to API RP60, a method which is well known to those of ordinary skill in the art. For purposes of this disclosure, methods of testing the characteristics of the proppant in terms of apparent specific gravity are the standard API tests that are routinely performed on proppant samples.

The term "conductivity," as used herein, is defined as the product of the width of the created fracture and the permeability of the proppant that remains in the fracture.

The term "degradable," as used herein, means the ability of a chemical or coating to dissolve or breakdown into smaller components under one or more downhole conditions.

The term "internal interconnected porosity," as used herein, is defined as a percentage of the pore volume, or void volume space, over the total volume of a porous ceramic particulate.

The term "permeability," as used herein, is defined as the ability of a material to allow a gas or liquid to pass through the material and is measured in accordance with ISO 13503-5: "Procedures for Measuring the Long-term Conductivity of Proppants," and expressed in terms of Darcy units, or Darcies (D).

Composite diversion particle agglomerations, methods for making composite diversion particle agglomerations, and methods for using composite diversion particle agglomerations are described herein. The composite diversion particle agglomerations can include a degradable component and a non-degradable component. The composite diversion particle agglomerations can be or include the non-degradable component embedded in, adhered to, coated with, encapsulated with, or otherwise surrounded by the degradable component. For example, the non-degradable component can be or include one or more particulates and the degradable component can be or include a polymeric material that dissolve or breakdown into smaller components in the presence of fluids including fracturing fluids, reservoir brine, treatment fluids. Such fluids can be water-based and/or oil-based and having reservoir temperatures. For example, the degradable component can dissolve or otherwise breakdown upon contact with fluids at temperatures from about 10° C., about 25° C., about 50° C., about 75° C., or about 100° C. to about 120° C., about 160° C., about 180° C., or about 200° C. or more.

The non-degradable component can include a plurality of particulates, or non-degradable particulates. Each particulate, or non-degradable particulate, of the plurality of non-degradable particulates can have any suitable size, such as for example, from about 2 mesh to about 400 mesh. For example, non-degradable particulates can have a size of about 10 mesh, 15 mesh, 20 mesh, 25 mesh, 30 mesh, or about 35 mesh to about 40 mesh, about 50 mesh, about 60 mesh, about 70 mesh, about 80 mesh, about 100 mesh, about 200 mesh, or about 300 mesh. In some embodiments, the non-degradable particulate size can range from about 5 mesh to about 150 mesh, from about 10 mesh to about 80 mesh, from about 20 mesh to about 40 mesh, from about 30 mesh to about 70 mesh, or from about 8 mesh to about 14 mesh.

The non-degradable particulates can have any suitable shape. In one or more embodiments, the particulates can be spherical, oblong, oblate, prolate, egg-shaped, cylindrical, or unsymmetrical. In one or more embodiments, the non-degradable particulates are substantially round and spherical. The term "substantially round and spherical" and related forms, as used herein, is defined to mean an average ratio of minimum diameter to maximum diameter of about 0.8 or greater, or having an average sphericity value of about 0.8 or greater compared to a Krumbein and Sloss chart.

The non-degradable particulates can be or include ceramic proppant, sand, solid glass beads, hollow glass beads, plastic beads, walnut shells, and other ceramic or resin coated proppant. The ceramic proppant can be formed from calcined, partially calcined, or uncalcined kaolin clay, diaspore clay, burley clay, flint clay, fly ash, bauxite and alumina, or mixtures thereof. The ceramic proppant can be manufactured according to any suitable process including spray atomization, drip casting, spray fluidization, spray drying, granulation or compression. Suitable proppants and methods for manufacture are disclosed in U.S. Pat. Nos. 4,068,718, 4,427,068, 4,440,866, 5,188,175, 7,036,591, 7,678,723, 8,063,000, 8,614,157, 8,865,631, 8,883,693, 9,175,210, 9,670,400, and 9,670,401, the entire disclosures of which are incorporated herein by reference.

The ceramic proppant can contain silica and/or alumina in any suitable amounts. According to one or more embodiments, the ceramic proppant includes less than 80 wt %, less than 60 wt %, less than 40 wt %, less than 30 wt %, less than 20 wt %, less than 10 wt %, or less than 5 wt % silica based on the total weight of the proppant particle. According to one or more embodiments, the ceramic proppant includes from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to one or more embodiments, the proppant particle includes at least about 30 wt %, at least about 50 wt %, at least about 60 wt %, at least about 70 wt %, at least about 80 wt %, at least about 90 wt %, or at least about 95 wt % alumina based on the total weight of the proppant particle. According to several exemplary embodiments, the ceramic proppant includes from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina.

The non-degradable particles can include a resin coating. For example, the ceramic proppant can be coated or encapsulated with a resin coating. According to one or more embodiments, the resin coating composes less than 50 wt %, less than 40 wt %, less than 30 wt %, less than 20 wt %, less than 10 wt %, less than 5 wt %, or less than 2 wt % of the total weight of the proppant particle. The resin coating can be non-degradable or degradable at typical reservoir temperature and pressure. According to one or more embodiments, the non-degradable resin coating is composed of thermoset resin chemistry based on phenolic novolacs, epoxies, or urethanes. According to one or more embodiments, the degradable resin coating is composed of any suitable degradable material. Suitable degradable materials include polyvinyl alcohol, polylactic acid, polyglycolic acid, polyacrylic acid, starch and starch based derivatives, cellulose and cellulose ethers, carboxymethyl cellulose, acrylic latex, guar gum, xanthum gum, pectins, chitosan, chitin, dextran, polyacrylamine, hydroxypropyl methacrylamide, polyethylene glycol, polypropylene glycol, polyvinylpyrrolidone, polytrimethylene terephthalate, polybutylene succinate, polybutylene adipate terephthalate, polybutylene adipate succinate, and polyvinyl acetate, polyolefins, water-soluble polymers and any mixtures, combinations, or copolymers thereof.

The non-degradable particulates can have any suitable bulk density. As used herein, the term "bulk density" refers to the weight per unit volume (grams per cubic centimeter) of a plurality of objects including the void spaces between the particles in the volume considered. In one or more embodiments, the non-degradable particulates have a bulk density of less than 3 g/cc, less than 2.5 g/cc, less than 2.2 g/cc, less than 2 g/cc, less than 1.8 g/cc, less than 1.6 g/cc, or less than 1.5 g/cc. The non-degradable particulates can have a bulk density of about 0.05 g/cc, about 0.5 g/cc, about 1 g/cc, about 1.15 g/cc, about 1.25 g/cc, about 1.35 g/cc, or about 1.45 g/cc to about 1.5 g/cc, about 1.6 g/cc, about 1.75 g/cc, about 1.9 g/cc, or about 2.1 g/cc or more. For example, the non-degradable particulates can have a bulk density of about 1.3 g/cc to about 1.8 g/cc, about 1.35 g/cc to about 1.65 g/cc, or about 1.5 g/cc to about 1.9 g/cc.

According to several exemplary embodiments, the proppant compositions disclosed herein include porous and/or non-porous proppant particulates having any suitable permeability and conductivity in accordance with ISO 13503-5: "Procedures for Measuring the Long-term Conductivity of Proppants," and expressed in terms of Darcy units, or Darcies (D). A pack of the proppant particulate 104, having a 20/40 mesh size range, can have a long term permeability at 7,500 psi of at least about 1 D, at least about 2 D, at least about 5 D, at least about 10 D, at least about 20 D, at least about 40 D, at least about 80 D, at least about 120 D, at least about 150 D, at least about 200 D, or at least about 250 D. The pack of the proppant particulate 104, having a 20/40 mesh size range, can have a long term permeability at 12,000 psi of at least about 1 D, at least about 2 D, at least about 3 D, at least about 4 D, at least about 5 D, at least about 10 D, at least about 25 D, at least about 50 D, at least about 100 D, at least about 150 D, or at least about 200 D. The pack of the proppant particulate 104, having a 20/40 mesh size range, can have a long term permeability at 15,000 psi of at least about 1 D, at least about 2 D, at least about 3 D, at least about 4 D, at least about 5 D, at least about 10 D, at least about 25 D, at least about 50 D, at least about 75 D, at least about 100 D, or at least about 150 D. The pack of the proppant particulate 104, having a 20/40 mesh size range, can have a long term permeability at 20,000 psi of at least about 1 D, at least about 2 D, at least about 3 D, at least about 4 D, at least about 5 D, at least about 10 D, at least about 25 D, at least about 50 D, at least about 75 D, or at least about 100 D.

The degradable component can be or include any suitable degradable material. Suitable degradable materials include polyvinyl alcohol, polylactic acid, polyglycolic acid, polyacrylic acid, starch and starch based derivatives, cellulose and cellulose ethers, carboxymethyl cellulose, acrylic latex, guar gum, xanthum gum, pectins, chitosan, chitin, dextran, polyacrylamine, hydroxypropyl methacrylamide, polyethylene glycol, polypropylene glycol, polyvinylpyrrolidone, polytrimethylene terephthalate, polybutylene succinate, polybutylene adipate terephthalate, polybutylene adipate succinate, and polyvinyl acetate, polyolefins, water-soluble polymers and any mixtures, combinations, or copolymers thereof. In one or more embodiments, the degradable material includes polyvinyl alcohol, polylactic acid, or a mixture thereof. In some embodiments, the degradable material may be formed substantially of polyvinyl alcohol and derivatives thereof. The polyvinyl alcohols can have a wide range of hydrolysis that can be sub-partially hydrolyzed, partially hydrolyzed or fully hydrolyzed. Polyvinyl alcohols can have atactic, isotactic, heterotactic and syndiotactic stereospecificity. Changes in the stereospecificity of polyvinyl alcohol affect thermal resistance, crystallinity, melting point, the rate of water dissolvability and biodegradability. Polyvinyl alcohol can include vinyl alcohol units and, in some embodiments, consists essentially of vinyl alcohol units. In some embodiments, polyvinyl alcohol is part of a co-polymer material that contains one grade of polyvinyl alcohol to multiple grades of polyvinyl alcohol and at least one other polymer type. Polyvinyl alcohol may also be partially or fully functionalized to produce a polymer that is also water dissolvable. For example, polyvinyl alcohol may be reacted with acetic acid or an equivalent to produce polyvinyl acetate. In one or more embodiments, the polyvinyl alcohol can have a molecular weight from about 500, about 1,000, about 5,000, or about 10,000 to about 25,000, about 50,000, about 100,000, or about 150,000. In one or more embodiments, the polyvinyl alcohol can have a degree of polymerization from about 100, about 250, or about 500 to about 750, about 1,000, about 1,500, or about 3,000.

In one or more embodiments, the degradable material includes polylactic acid. In some embodiments, the degradable material may be formed substantially of polylactic acid. Polylactic acid can be prepared according to any method known in the state of the art. For example, polylactic acid can be prepared from lactic acid and/or from one or more of D-lactide (e.g., a dilactone, or a cyclic dimer of D-lactic acid), L-lactide (e.g., a dilactone, or a cyclic dimer of L-lactic acid), meso D,L-lactide (e.g., a cyclic dimer of D- and L-lactic acid), and racemic D,L-lactide (e.g., racemic D,L-lactide comprises a 1/1 mixture of D- and L-lactide).

The degradable material can be a thermoplastic that is produced from any combination of monomers or low molecular weight precursors that can produce a water dissolvable or degradable polymer. The polymers can be produced by any chemical means known such as a condensation reaction or a radical polymerization with and without catalysts in both instances. The thermoplastic polymer or combination of thermoplastic polymers may be among amorphous, semicrystalline or crystalline polymers.

Other suitable degradable materials include unimodal or multimodal polymeric mixtures of ethylene or other suitable, linear, non-linear or branched alkene plastics, such as isoprene, propylene, and the like. Such ethylene polymeric mixtures can include ethylene and one or more co-monomers selected from the group of alpha-olefins having up to 12 carbon atoms, which in the case of ethylene polymeric mixtures means that the co-monomer or co-monomers are chosen from alpha-olefins having from 3 to 12 carbon atoms (i.e., $C_3$-$C_{12}$), including those alpha-olefins having 3 carbon atoms, 4 carbon atoms, 5 carbon atoms, 6 carbon atoms, 7 carbon atoms, 8 carbon atoms, 9 carbon atoms, 10 carbon atoms, 11, carbon atoms, or 12 carbon atoms. Alpha-olefins suitable for use as co-monomers with ethylene can be substituted or un-substituted linear, cyclic or branched alpha-olefins. Suitable co-monomers include but are not limited to 1-propene, 1-butene, 4-methyl-l-pentene, 1-pentene, 1-hexene, 1-octene, 1-decene, 1-dodecene, and styrene.

Ethylene polymeric mixtures can include ethylene-octene polymeric mixtures, ethylene-butene mixtures, ethylene-styrene mixtures, and ethylene-pentene mixtures. Ethylene polymeric mixtures can include ethylene-a-olefin polymers. Suitable ethylene-a-olefin polymers include linear copolymers, branched copolymers, block copolymers, A-B-A triblock copolymers, A-B diblock copolymers, A-B-A-B-A-B multiblock copolymers, and radial block copolymers, and grafted versions thereof, as well as homopolymers, copolymers, and terpolymers of ethylene and one or more alpha-olefins. Examples of suitable ethylene-a-olefin polymers include block copolymers having the general configuration A-B-A, having styrene endblocks and ethylene-butadiene or ethylene-butene midblocks, linear styrene-isoprene-styrene polymers, radial styrene-butadiene-styrene polymers and linear styrene-butadiene-styrene polymers.

The degradable component can also include a tracer material 108 so that an operator in the field can determine, through the use of certain downhole tools and other suitable detection equipment, if the degradable material has dissolved or otherwise flowed back from the formation, fracture, and/or borehole region in produced fluid. The tracer material can include radioactive chemical tracers, non-radioactive chemical tracers, nanoparticles, biomarkers, such as DNA, fluorescent tracers, soluble metal-ligand coordination complexes, and nonmetallic tracers and the like. In one or more embodiments, the radioactive material can include radioactive isotopes, or gamma-ray emitting isotopes, of gold, iodine, iridium, scandium, antimony, silver, hafnium, zirconium, rubidium, chromium, iron, strontium, cobalt, zinc, or mixtures thereof. In one or more embodiments, the fluorescent tracer includes thallium salen complexes, for which simple handheld laser excitation sources can be used to detect its presence in fluid produced from the well. In one or more embodiments, the soluble metal-ligand coordination complex is based on chelating ligands such as salen, porphyrin, phthalocyanine, or derivatives thereof. In one or more embodiments, the biomarker includes single stranded and/or double stranded DNA. In several exemplary embodiments, multiple unique tracers can be used across all of the stages with a fractured well, enabling the well operator to match the tracer in the produced fluid to the section of the fracture where it was pumped.

The non-degradable component can also include a tracer material. For example a tracer material can be contained within a coating of the non-degradable component so that an operator in the field can determine, through the use of suitable detection equipment, if the non-degradable component remains in the fracture and/or borehole region. The tracer material can include radioactive chemical tracers, non-radioactive chemical tracers, nanoparticles, biomarkers, such as DNA, fluorescent tracers, soluble metal-ligand coordination complexes, and nonmetallic tracers and the like. In one or more embodiments, the radioactive material can include radioactive isotopes, or gamma-ray emitting isotopes, of gold, iodine, iridium, scandium, antimony, silver, hafnium, zirconium, rubidium, chromium, iron, strontium, cobalt, zinc, or mixtures thereof. In one or more embodiments, the fluorescent tracer includes thallium salen complexes, for which simple handheld laser excitation sources can be used to detect its presence in fluid produced from the well. In one or more embodiments, the soluble metal-ligand coordination complex is based on chelating ligands such as salen, porphyrin, phthalocyanine, and derivatives thereof. In one or more embodiments, the biomarker includes single stranded and/or double stranded DNA. In several exemplary embodiments, multiple unique tracers can be used across all of the stages with a fractured well, enabling the well operator to match the tracer in the produced fluid to the section of the fracture where it was pumped. The non-degradable component can also include a tracer material so that an operator in the field can determine, through the use of certain downhole tools and other suitable detection equipment, if the non-degradable component remains in the fracture and/or borehole region, and to the extent that the fracture remains open and connected to the borehole. The tracer material can be/can include non-radioactive thermal neutron absorbing materials and the like. In one or more embodiments, the thermal neutron absorbing material includes boron, cadmium, gadolinium, iridium, samarium, or mixtures thereof. In one or more exemplary embodiments, the thermal neutron absorbing material include boron carbide, samarium oxide, and/or gadolinium oxide. In one or more exemplary embodiments, the gadolinium oxide is part of the interior composition of the non-degradable component. A downhole tool emitting thermal neutrons can detect the presence of the thermal neutron absorbing material to detect diverter placement, diverted zones, and whether the degradable material has degraded.

Figure 1:
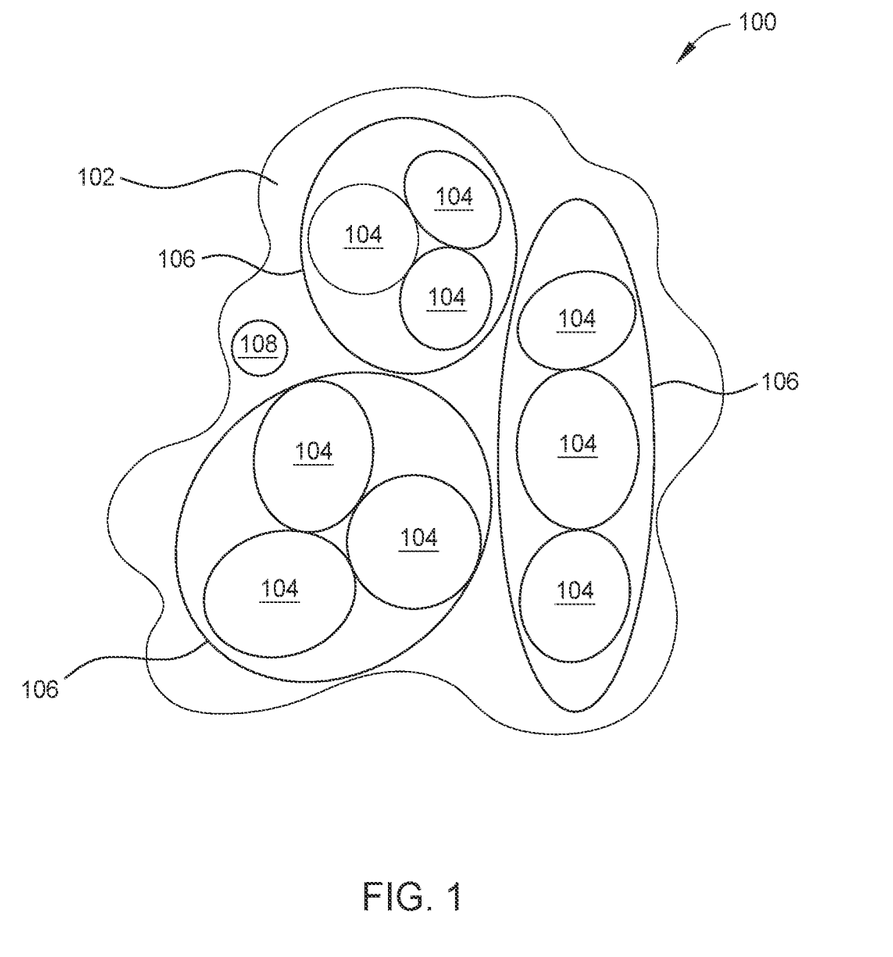
FIG. 1 shows a cross-sectional view of a composite diversion particle agglomeration containing a degradable component surrounding or encapsulating a plurality of non-degradable particles, according to several embodiments.

FIG. 1 shows a cross-sectional view of a composite diversion particle agglomeration 100 containing a non-degradable component 106 embedded in, adhered to, coated with, encapsulated by or otherwise surrounded by a degradable component 102. The degradable component 102 can encapsulate from 2, 3, 4 or 5 to 7, 10, 15, or 25 or more non-degradable particles 104. In one or more exemplary embodiments, the composite diversion particle agglomeration 100 contains 2 to 5 non-degradable particles 104, 7 to 15 non-degradable particles 104, or 5 to 25 non-degradable particles 104. As shown in FIG. 1, 9 non-degradable particles 104 are encapsulated by the degradable component 102. The non-degradable particles 104 can be in direct contact with each other. In one or more embodiments, at least a portion of the degradable component 102 can be sandwiched or otherwise disposed between two or more non-degradable particles 104. In one or more embodiments, two or more non-degradable particles 104 are encapsulated or embedded in a degradable component 102.

The composite diversion particle agglomeration 100 can be provided using any suitable methods. In one or more embodiments, the composite diversion particle agglomeration 100 can be provided by mixing non-degradable particles 104 with an aqueous solution containing the degradable material to provide a mixture. The mixture can contain any suitable concentration of proppant. In one or more embodiments, the mixture contains at least about 10 volume percent (%), at least about 40%, at least about 60%, at least about 75%, at least about 85%, or at least about 95% proppant. The mixing can be performed under any suitable temperatures. In one or more embodiments, the mixing is performed at temperature of from about 25° C., about 50° C. to about 100° C., about 150° C.

The obtained mixture can then be subjected to one or more drying and/or heating steps to provide the composite diversion particle agglomeration 100. The drying and/or heating can be performed under any suitable temperatures. In one or more embodiments, the drying and/or heating is performed at temperature of from ambient, or about 25° C. to about 150° C. In one or more embodiments (not shown), the mixture can also contain the degradable material in a powder, fiber, pastille, or flake form.

In one or more embodiments, the composite diversion particle agglomeration 100 can be obtained by mixing the non-degradable particles 104 with an aqueous solution containing a first degradable material to provide a mixture having a proppant concentration of at least about 20 volume percent and subjecting the mixture to drying at a temperature of from about 100° C. to about 200° C. to provide the composite diversion particle agglomeration 100. In one or more embodiments, a second degradable material can be added to the mixture. The second degradable material can be in the form of solid particles, such as solid particle flakes, powders, fibers or pastilles. The first and second degradable materials can have the same composition. In one or more embodiments, the first and second degradable materials can have different compositions. For example, the first degradable material can include polyvinyl alcohol and the second degradable material can include polylactic acid.

In one or more embodiments, the composite diversion particle agglomeration 100 can be coated or encapsulated with a third degradable material. The third degradable material can have the same or different composition as the first and/or second degradable material(s) used to make the composite diversion particle agglomeration 100.

Figure 2:
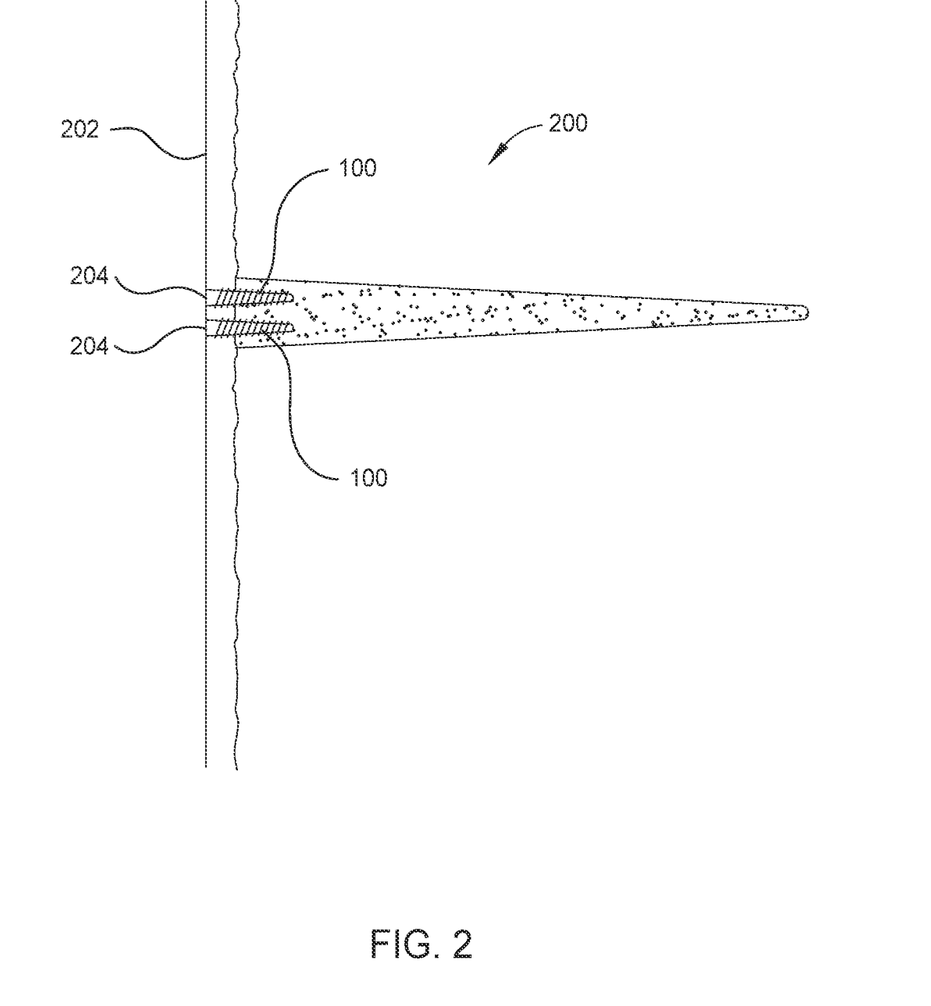
FIG. 2 illustrates a cross-sectional view of a subterranean fracture and an adjacent casing containing perforations that are filled with the composite diversion particle agglomeration prior to degradation that extend into the subterranean fracture, according to several embodiments.
Figure 3:
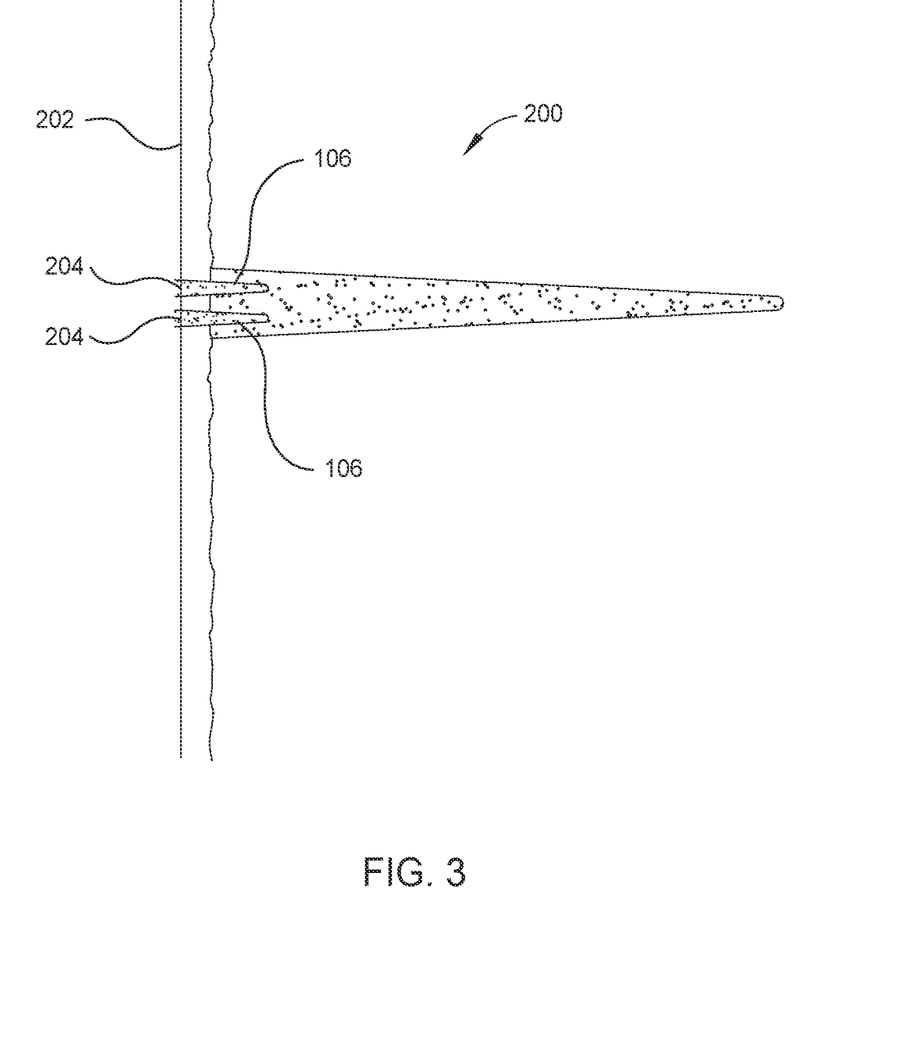
FIG. 3 illustrates a cross-sectional side view of the subterranean fracture illustrated in FIG. 2 after complete degradation or removal of the degradable component from the composite diversion particle agglomeration.

FIG. 2 illustrates a cross-sectional side view of a subterranean fracture 200 and an adjacent casing 202 containing perforations 204 that are placed with the composite diversion particle agglomerations 100 prior to degradation that extend into the subterranean fracture 200. After a period of time, the degradable component 102 of the composite diversion particle agglomerations 100 will be removed, for example through degradation or dissolution from contact with fluids, thereby leaving behind the non-degradable component 106 of the composite diversion particle agglomerations 104 in the subterranean fracture 200. FIG. 3 illustrates a cross-sectional side view of the subterranean fracture 200 after complete degradation or removal of the degradable component 102 from the composite diversion particle agglomerations 100.

In one or more embodiments, the fracture 200 experiences little, if any, fracture closure due to the removal of the degradable component 102 from the composite diversion particle agglomerations 100. In one or more embodiments, the fracture 200 experiences a closure, or reduction in fracture width, of less than 10%, less than 5%, less than 3%, less than 1%, or less than 0.1% due to the complete degradation or removal of the degradable component 102 from the composite diversion particle agglomerations 100. In one or more embodiments, the fracture 200 experiences no observable closure due to the complete degradation or removal of the degradable component 102 from the composite diversion particle agglomerations 100.

Figure 4:
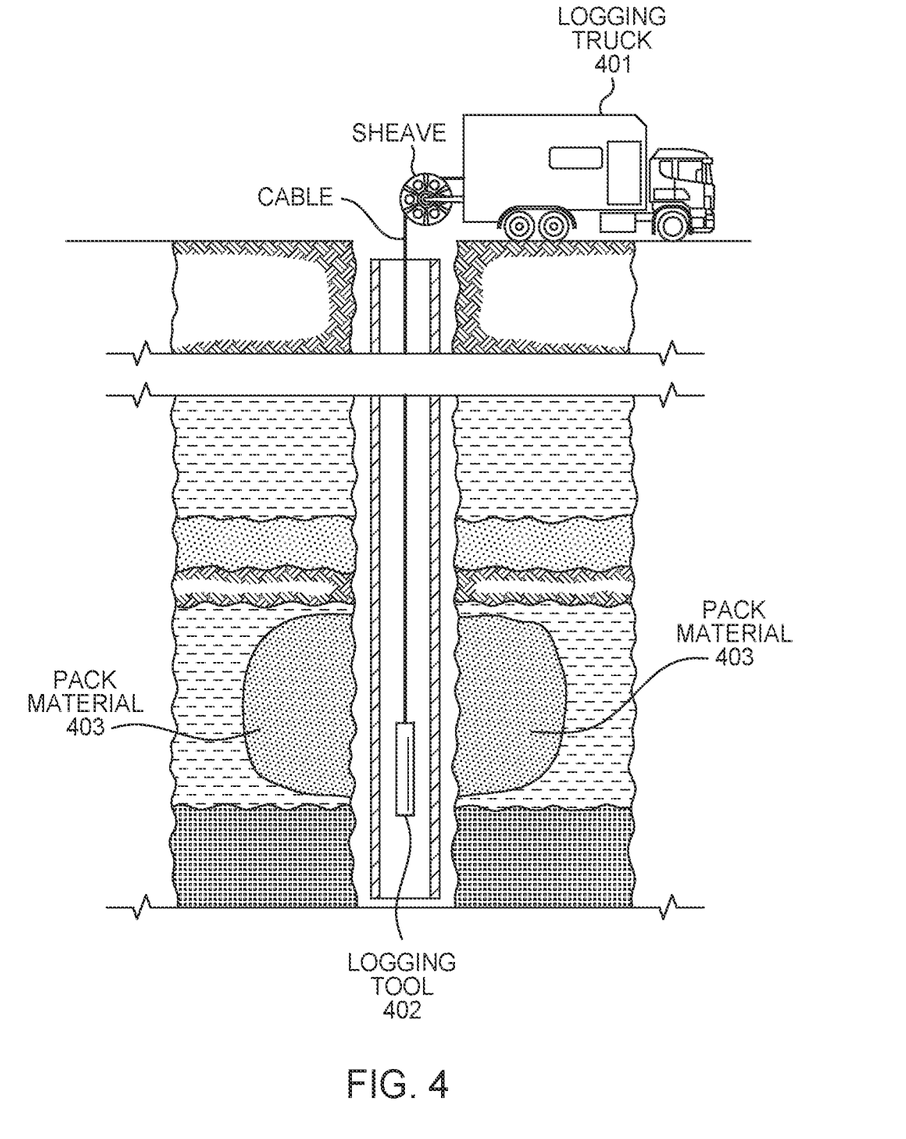
FIG. 4 illustrates a cross-sectional side view showing logging of a downhole formation containing induced fractures.

In one or more exemplary embodiments, a logging truck 401 at the well site can lower a neutron, compensated neutron, or PNC logging tool 402 to a depth of the fracture in the subterranean formation, as shown in FIG. 4. Power from the logging truck 401 (or skid) can be transmitted to the logging tool 402, which records and transmits logging data as the tool is logged past the pack material 403 placed in the fracture and the formations above and/or below the pack material 403.

According to several exemplary embodiments, the use of PNC calculated taggant (e.g. gadolinium) yields computed from PNC tool capture gamma ray spectra to locate thermal neutron absorbing material in diverting operations, including a new capture gamma ray spectroscopy-based method to assist in detecting the diverter material placed in the fracture(s).

According to one or more embodiments, the presence of thermal neutron absorbing material containing degradable material in a fracture can be obtained by:

1. Conducting a diverter operation in the well, incorporating the composite diversion particle agglomeration 100 containing the thermal neutron absorbing material into a fracture.

2. Running and recording, or otherwise obtaining, a first PNC log across the potential fracture zones to be diverted to obtain a first data set.

3. After a period of time, running and recording a second PNC log, if possible utilizing the same tool type as used in the first PNC log, across the potential zones of interest, including one or more fracture/perforation intervals to obtain a second data set. The logs may be run with the tool centered within the casing or tubing.

4. Comparing the first and second data sets from the first and second PNC logs (after any log normalization), to determine location of diverter material and/or presence of the non-degradable material or the degradable component. Normalization may be necessary if the first and second logs were run with different borehole conditions, or if different tools or sources were used. This may be especially true if the first log was recorded at an earlier time in the life history of the well, using wireline, memory, and/or logging-while-drilling (LWD) sensors. Normalization procedures compare the log data from zones preferably outside of the possibly diverted intervals in the first and second logs. Since these zones have not changed between the logs, the gains and/or offsets are applied to the logs to bring about agreement between the first and second logs in these normalization intervals. The same gains/offsets are then applied to the logs over the entire logged interval. Differences in the data indicate the presence of degradable material in the fracture(s) or borehole region.

In one or more embodiments, the first and second data sets can be obtained and utilized to determine the differences, if any, between the locations and/or quantities of diverter material in the perforated zones in the borehole region. The determined diverter material location differences can be utilized to determine if any diverter material from the one or more diverter locations was effectively dissolved, degraded or removed in any diverter removal procedure such as those described above. The determined diverter material location differences can also be utilized to determine if which perforations are open to the subterranean formation and which perforations remain closed to the surrounding subterranean formation due to the presence of the diverter material.

In one or more embodiments, the first and second data sets can be obtained and utilized to determine the differences, if any, between the locations and/or quantities of proppant, non-degradable component, material in the perforated zones in the borehole region. The determined non-degradable component location differences can be utilized to determine if any non-degradable particulates flowed back from the one or more diverter locations.

According to certain embodiments of the thermal neutron logging method, fast neutrons are emitted from a neutron source into the borehole region, and are rapidly thermalized to thermal neutrons by elastic and inelastic collisions with borehole region nuclei. Elastic collisions with hydrogen in the borehole region are a principal thermalization mechanism. The thermal neutrons diffuse in the borehole region, and are eventually absorbed by one of the nuclei present. Generally these absorption reactions result in the almost simultaneous emission of capture gamma rays; however, absorption by boron is a notable exception. The detectors in the PNC logging tool either directly detect the thermal neutrons that are scattered back into the tool, or indirectly by detecting the gamma rays resulting from the thermal neutron absorption reactions (in most commercial versions of PNC tools). Most PNC tools are configured with a neutron source and two detectors arranged above the neutron source which are referred to herein as a "near" detector and a "far" detector. According to embodiments of the present disclosure, pulsed neutron capture tools may be used that include one detector, or more than two detectors. For example, suitable PNC tools can incorporate a neutron source and three detectors arranged above the neutron source, which are referred to herein as the near, far, and "extra-far" or "xfar" detectors such that the near detector is closest to the neutron source and the xfar detector is the farthest away from the neutron source. It is also possible that one or more of the neutron or capture gamma ray detectors may be located below the neutron source.

A pulsed neutron capture tool logging system measures the decay rate (as a function of time between the neutron pulses) of the thermal neutron or capture gamma ray population in the formation and the borehole region. From this decay rate curve, the capture cross-section of the borehole $\Sigma_{bh}$ (sigma-bh), and the borehole decay component can be resolved and determined. The higher the total capture cross-sections of the materials in the borehole region, the greater the tendency for that material to capture thermal neutrons. Therefore, in a borehole region having a high total capture cross-section, the thermal neutrons disappear more rapidly than in a formation having a low capture cross-section. This appears as a steeper slope in a plot of the observed count rate versus time after the neutron burst.

It is understood that modifications to the present disclosure may be made as might occur to one skilled in the field of the invention within the scope of the appended claims. All embodiments contemplated hereunder which achieve the objects of the present disclosure have not been shown in complete detail. Other embodiments may be developed without departing from the spirit of the present disclosure or from the scope of the appended claims. Although the present disclosure has been described with respect to specific details, it is not intended that such details should be regarded as limitations on the scope of the present disclosure.

What is claimed is:

1. A method of placing a diverter material in a subterranean formation, comprising:
   injecting a hydraulic fluid comprising a composite diversion material into a wellbore and, subsequently into an adjacent subterranean formation at a rate and pressure sufficient to place the composite diversion material into a fracture in the subterranean formation; and
   removing a degradable component from the composite diversion material by contact with a water-based fluid after a period of time from placement in the fracture, wherein the composite diversion material comprises:
      an agglomeration of a non-degradable component and the degradable component, wherein:
         the non-degradable component comprises three or more non-degradable particulates, wherein the non-degradable particulates have a long term permeability at 7,500 psi of at least about 20 D; and
         the degradable component is coated onto and encapsulates two or more non-degradable particulates;
      wherein the degradable component comprises a tracer material.

2. The method of claim 1, wherein one of the degradable component or the non-degradable component comprises a thermal neutron absorbing material.

3. The method of claim 1, further comprising:
   obtaining a first data set by:
      lowering into the wellbore a pulsed neutron logging tool comprising a pulsed neutron source and a detector,
      emitting pulses of neutrons from the pulsed neutron source into the fracture containing the composite diversion material,
      detecting capture gamma rays;
   obtaining a second data set by:
      lowering into the wellbore a pulsed neutron logging tool comprising a pulsed neutron source and a detector,
      emitting pulses of neutrons from the pulsed neutron source into the fracture containing the composite diversion material,
      detecting capture gamma rays; and
   comparing the first data set and the second data set to determine removal of the degradable component from the composite diversion material placed in the fracture.

4. The method of claim 1, where in the fracture experiences a reduction in width of less than 5% when the degradable component is substantially or completely removed from the composite diversion material from the composite diversion material was initially placed into the fracture.

5. The method of claim 1, wherein the degradable component further comprises one or more of polylactic acid, polyglycolic acid, starch, cellulose, carboxymethyl cellulose, acrylic latex, guar, polytrimethylene terephthalate, polybutylene succinate, polybutylene adipate terephthalate, polybutylene adipate succinate, polyolefins, water-soluble polymers and any combinations thereof.

6. The method of claim 1, wherein the non-degradable component encapsulates about 4 to about 5 non-degradable particulates.

7. The method of claim 1, wherein the degradable component comprises a polymeric material configured to degrade in the presence of a water-based fluid at a temperature from about 25° C. to about 180° C.

8. The method of claim 7, wherein the water-based fluid is brine.

9. The method of claim 1, wherein the degradable component comprises a functionalized or hydrolyzed polyvinyl alcohol.

10. The method of claim 9, wherein the degradable component is partially functionalized.

11. The method of claim 9, wherein the degradable component is fully functionalized.

12. The method of claim 9, wherein the degradable component is functionalized by reacting a polyvinyl alcohol with acetic acid.

13. The method of claim 12, wherein the degradable component is polyvinyl acetate.

14. The method of claim 1, wherein the non-degradable component encapsulates about 3 to about 6 non-degradable particulates.

15. The method of claim 1, wherein the degradable component encapsulates 2 to 25 non-degradable particles.

16. The method of claim 15, wherein the degradable component encapsulates 2 to 5 non-degradable particles.

17. The method of claim 15, wherein the non-degradable particles are in direct contact with each other.

18. The method of claim 15, wherein the degradable component encapsulates 5 to 25 non-degradable particulates.

19. The method of claim 18, wherein the degradable component encapsulates 7 to 15 non-degradable particles.

* * * * *